Nov. 12, 1963     J. BECKER     3,110,752
COLOR CORRECTED OPTICAL SYSTEM CONTAINING
A CONCAVE SPHERICAL MIRROR
AND A MENISCUS LENS
Filed Aug. 8, 1960

INVENTOR.
Johannes Becker,
BY
Wenderoth, Lind & Ponack
ATTYS.

3,110,752
COLOR CORRECTED OPTICAL SYSTEM CONTAINING A CONCAVE SPHERICAL MIRROR AND A MENISCUS LENS
Johannes Becker, Delft, Netherlands, assignor to N.V. Optische Industrie "de Oude Delft," Delft, Netherlands
Filed Aug. 8, 1960, Ser. No. 48,799
2 Claims. (Cl. 88—57)

This application is a continuation-in-part of my application Serial No. 502,803 filed April 21, 1955, now abandoned, entitled "Optical System Containing a Concave Spherical Mirror and a Meniscus."

The invention refers to an optical system containing a concave spherical mirror and a simple or compound meniscus the concave side of which is turned towards the center of curvature of the mirror. Such systems are disclosed in Dutch Patents Nos. 59,173 and 59,728 in applicant's name.

The object of the invention is to perfect the correction of chromatic aberration of existing systems. This is desirable because these systems in their present form involve the drawback that they do not to a sufficient extent eliminate chromatic aberration of the second category, which gives rise to colored edges in the image, the degree of enlargement afforded by the system being different for different colors. This drawback is particularly pronounced in the case of large focal distances, as the lack of sharpness that is produced at a given image angle as a result of chromatic aberration of the second category increases in direct proportion to the focal distance.

Chromatic aberration of the second category can, according to the invention, be eliminated by means of a color correction plate the effect of which will, for the sake of clarity, be illustrated by reference to a special case. It has been found, however, that the color correction plate also serves its purpose when applied to cases differing considerably from this special case.

The special case to which the invention is applied is that of a pure concentric system in which a simple concentric meniscus positioned concentrically with the surface of the mirror is employed. For the purpose of studying the chromatic aberration we may imagine the mirror to be eliminated, so that only the concentric meniscus need now be considered. The two main surfaces of this system coincide in the coincident centers of curvature of the two refracting surfaces of the meniscus. If we now, as in the invention, place a color correction plate with flat external surfaces and a curved internal surface in the coincident main surfaces of the meniscus, a system is formed the components of which are the color correction plate and the meniscus. Since the main surfaces of the color correction plate—which is only of very small thickness—are situated in this plate and are therefore practically coincident with the main surfaces of the lens, the main surfaces of the plate-and-lens-system also coincide with the latter. If the internal surface is given such a radius of curvature and such a difference in index of refraction that the system is achromatic, then chromatic aberration not only of the first category—referring to the position of the focal plane—but, in addition, chromatic aberration of the second category is automatically eliminated. This property is of course maintained when a concave spherical mirror is added to the color correction plate and the meniscus, so that an optical system is formed which is corrected apochromatically for chromatic aberration of both the first and the second category.

This result is obtained with a color correction plate which is very easy to manufacture, combined with a simple meniscus.

The meniscus may sometimes be constructed as a doublet whereby chromatic aberration of the first category is entirely or mostly eliminated, while chromatic aberration of the second category and any residual chromatic aberration of the first category is corrected by the color correction plate. This latter system will be found serviceable when fillers are placed near the plane of the image as is generally required, for instance, in the case of aircraft cameras. These filters introduce chromatic aberration of the first category, which is eliminated by means of the internal surface in the meniscus, while chromatic aberration of the second category—which is uninfluenced by the filter—is in turn corrected by the color correction plate.

It is possible, within wide limits, to depart from the "ideal" (or purely concentric) position without appreciably diminishing the desired effect. Thus, the meniscus need not be exactly concentric, and the color correction plate may be positioned away from the center of curvature of the mirror, but preferably still on the concave side of the meniscus. This latitude affords, for instance, the possibility of shortening the constructional length of the system.

The color correction plate consists, in its simple form, of a plano-parallel plate with a cement surface. It is desirable, however, particularly with larger diameters, to refrain from cementing the parts of the color correction plate. Moreover, the plate may be made in more than two parts.

Three embodiments of the system of the invention are shown as examples in the drawings.

Figure 1:
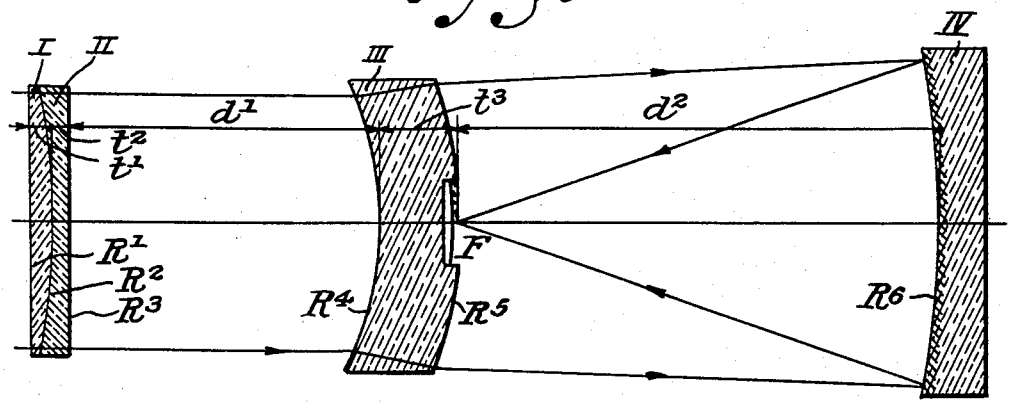
FIGURE 1 shows a cross-section of a purely concentric optical system with a simple meniscus.

The system of FIGURE 1 contains a color correction plate with components I and II, meniscus III and the concave spherical mirror IV. The glass thickness $t$, the distances $d$, the radii of curvature R and the types of glass are indicated in the table below. All the measurements in this and the following tables are in millimetres. Moreover, the focal length in all the examples is 100 mm. and the relative aperture 1:1.6. The photographic resolving power, when these systems are constructed on three times as large a scale, i.e. with a focal length of 300 mm., is 50 lines per mm. for objects of low contrast.

The system of FIGURE 1 has the following constructional data.

| Optical element | Radius of curvature | Thickness and distance | Material |
|---|---|---|---|
| Lens I | $R_1 = \infty$ | $t_1 = 5$ | $n_d = 1.517$ $v = 52.3$ |
| Lens II | $R_2 = -199.5$ $R_3 = -199.5$ | $t_2 = 5$ | $n_d = 1.517$ $v = 64.1$ |
| | $R_3 = \infty$ | $d_1 = 75.9$ | |
| Lens III | $R_4 = -79.28$ | $t_3 = 21.3$ | $n_d = 1.517$ $v = 64.1$ |
| | $R_5 = -100.58$ | $d_2 = 120$ | |
| Mirror IV | $R_6 = -220.45$ | | |

Figure 2:
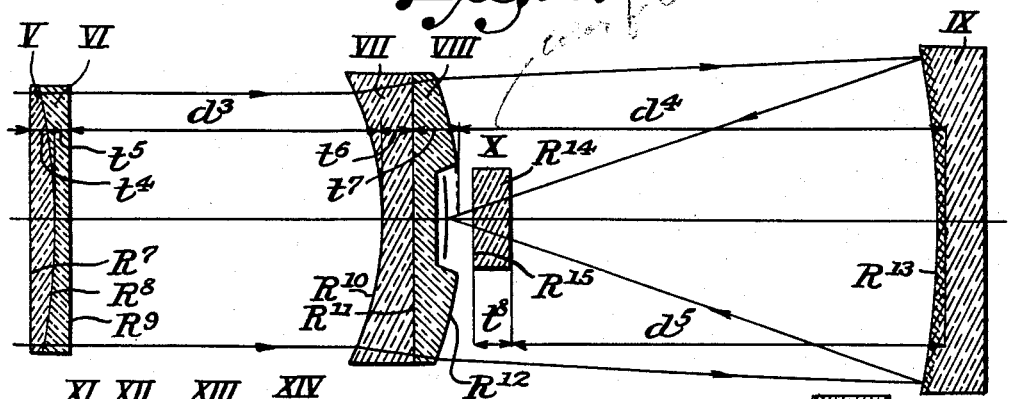
FIGURE 2 shows a concentric system in cross-section, but with the meniscus in the form of a cemented doublet and is intended for use in conjunction with a filter.

The system of FIGURE 2 has the following constructional data.

| Optical element | Radius of curvature | Thickness and distance | Material |
|---|---|---|---|
| Lens V | $R_7 = \infty$ | $t_4 = 5$ | $n_d = 1.517$ |
|  | $R_8 = -199.5$ |  | $v = 52.3$ |
| Lens VI | $R_8 = -199.5$ | $t_5 = 5$ | $n_d = 1.517$ |
|  | $R_9 = \infty$ |  | $v = 64.1$ |
|  |  | $d_3 = 75.9$ |  |
| Lens VII | $R_{10} = -79.28$ | $t_6 = 9$ | $n_d = 1.517$ |
|  | $R_{11} = \infty$ |  | $v = 64.1$ |
| Lens VIII | $R_{11} = \infty$ | $t_7 = 12.3$ | $n_d = 1.518$ |
|  | $R_{12} = -100.58$ |  | $v = 61.4$ |
| Mirror IX | $R_{13} = -220.45$ | $d_4 = 120$ |  |
|  |  | $d_5 = 110$ |  |
| Filter X | $R_{14} = \infty$ | $t_8 = 11.7$ | $n_d = 1.539$ |
|  | $R_{15} = \infty$ |  | $v = 59.5$ |

Finally, the constructional data of the FIGURE 3 system is shown below.

| Optical element | Radius of curvature | Thickness and distance | Material |
|---|---|---|---|
| Lens XI | $R_{16} = \infty$ | $t_9 = 8.5$ | $n_d = 1.532$ |
|  | $R_{17} = -100$ |  | $v = 48.8$ |
| Lens XII | $R_{17} = -100$ | $t_{10} = 6$ | $n_d = 1.531$ |
|  | $R_{18} = \infty$ |  | $v = 63.2$ |
|  |  | $d_6 = 13$ |  |
| Lens XIII | $R_{19} = -79.28$ | $t_{11} = 9$ | $n_d = 1.517$ |
|  | $R_{20} = \infty$ |  | $v = 56.8$ |
| Lens XIV | $R_{20} = \infty$ | $t_{12} = 12.3$ | $n_d = 1.517$ |
|  | $R_{21} = -100.58$ |  | $v = 64.1$ |
| Mirror XV | $R_{22} = -220.45$ | $d_7 = 120$ |  |

The basic idea of the invention is that a concentric mirror meniscus system consisting of the meniscus III and the mirror IV (see FIGURE 1) is corrected for all aberrations except chromatic aberrations. The classic way to have these chromatic aberrations also corrected is to split the meniscus into two components made of glasses of slightly different dispersion.

By this method of color corection it is not possible, however, to correct the axial color and the lateral color at the same time. This results in too great residual chromatic aberrations particularly when the system has a long focal length.

The inventive idea is that the meniscus lens III is made of one glass and that the color correction is performed by a separate element, situated adjacent the center of curvature of the system. Thus the axial and the lateral color are corrected simultaneously and thus the system is made apochromatic even for extremely long focal length.

Figure 3:
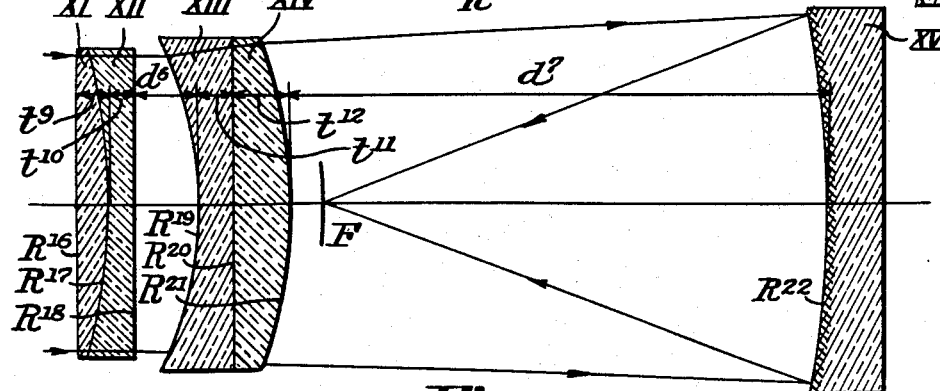
FIGURE 3 shows a concentric system, likewise in cross-section, of reduced length.

The systems represented in FIGURE 2 and FIGURE 3 are more special cases, in which, however, the basic approach to the problem, is the same as in the system of FIGURE 1. FIGURE 2 deals with the special case in which a color filter X has to be applied and the slight color aberration introduced by this plate is compensated by splitting the meniscus lens into two components VII and VIII.

A certain latitude for deviation from the ideal cases represented in FIGURES 1 and 2 is possible and in FIGURE 3 such deviation from the ideal case is represented.

The substantially plane external surface of the correction plate is understood to include surfaces wherein such external surfaces for a curvature upon a relatively long radius are spherically curved and not aspherically. Whenever the term occurs that the color correction plate is located substantially at the center of curvature of the mirror it is to be understood that such correction plate may be located at the center of curvature of closely adjacent thereto upon either side of the center of curvature of the mirror. The maximum distance between the color correction plate and the center of curvature of the mirror not surpassing say one-third of the equivalent focal length of the system.

In the vast majority of applications of the meniscus-mirror system, the invention offers for the first time the possibility to completely elminate the chromatic aberrations by such simple means as a doublet plane-parallel plate whose manufacture and adjustment requires no specialized machinery or skill.

The color correcting plate of the present invention has flat external surfaces or spherical external surfaces so slightly curved that the plate is substantially powerless. Consequently, the color correcting plate cannot and must not influence monochromatic correction. Its sole purpose is to correct the system for axial and lateral color by means of its curved internal surface.

I claim:
1. An optical system comprising a concave spherical mirror and a compound spherical aberration correcting meniscus lens of negative power in operative optical alignment axially air spaced from said mirror and having its concave side turned towards the center of curvature of said mirror, a color correction plate having plane external surfaces and an internal spherical surface located substantially at the center of curvature of said mirror, said internal surface separating materials having substantially equal refractive indices for light of an intermediate wave-length but differing in dispersion, whereby said system is achromatized for long focal length, said meniscus lens being a doublet having a spherical internal surface whose radius of curvature is substantially greater than the radii of curvature of its external surfaces, said internal surface of said meniscus lens separating materials of substantially equal refractive indices for light of an intermediate wave-length but differing in dispersion.

2. A reflecting optical system comprising a concave spherical mirror and a doublet meniscus lens of weak negative power in operative optical alignment axially air spaced from said mirror and having spherical external surfaces and a spherical internal surface, said external surfaces being substantially concentric with said concave mirror, said internal surface having a radius of curvature substantially greater than the radii of curvature of said external surfaces and separating materials of substantially equal refractive indices for light of an intermediate wave-length but different dispersions, and a plane-parallel color correction plate having a spherical internal surface located substantially at the center of curvature of said concave mirror, said internal surface of said plate separating materials of substantially equal refractive indices for light of an intermediate wave-length but different dispersions, whereby said meniscus lens corrects for the spherical aberration of said concave mirror and for at least part of the axial color of said system and said color correction plate corrects for the lateral color and the remainder of the axial color of said system.

References Cited in the file of this patent

UNITED STATES PATENTS 2,830,495    Koch et al. _____ Apr. 15, 1958

OTHER REFERENCES

Hawkins et al.: "An Improved Type of Schmidt Camera," Nature, Vol. 157, No. 3988, 1946, pages 445, 446.

Linfoot: "Recent Advances in Astronomical Camera Design," The Photographic Journal, Vol. 88B, 1948, pages 58–64.